(Model.)
A. POTTER.
GAGE FOR PLANER KNIVES.
No. 348,341. Patented Aug. 31, 1886.
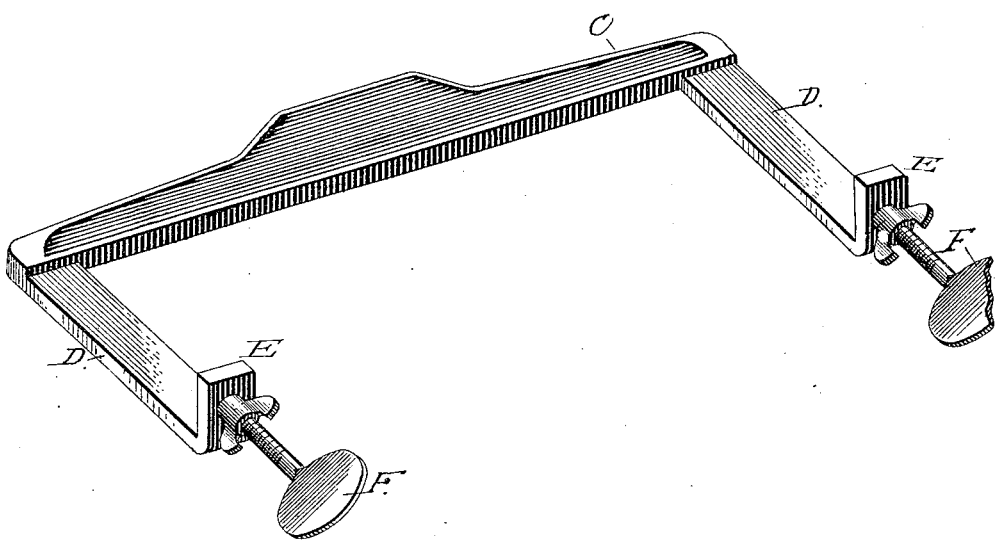
Witnesses:
Chas. R. Darling
C. D. Bowler
Inventor:
Addison Potter
By F. R. Strong
Attorney

UNITED STATES PATENT OFFICE.

ADDISON POTTER, OF PORTLAND, OREGON, ASSIGNOR OF ONE-HALF TO N. W. SPAULDING, OF SAN FRANCISCO, CALIFORNIA.

GAGE FOR PLANER-KNIVES.

SPECIFICATION forming part of Letters Patent No. 348,341, dated August 31, 1886.

Application filed February 20, 1885. Serial No. 156,519. (Model.)

*To all whom it may concern:*

Be it known that I, ADDISON POTTER, of Portland, Multnomah county, State of Oregon, have invented an Improvement in Setting Devices for Planer-Knives; and I hereby declare the following to be a full, clear, and exact description of the same.

My invention relates to a device for rapidly and accurately setting the knives or cutters upon planer-heads, so as to insure both ends being at the same distance from the head, and all the cutters being equally set.

It consists of a bar, one edge of which serves as a guide against which the edge of the planer-knife may be set, and arms extending backward from this bar and adjustable, by screws or otherwise, from the rear of the planer-head, as will be more fully explained by reference to the accompanying drawing, in which the figure is a view of my device applied to an ordinary wood-planer.

In the ordinary construction of planers a head is journaled, so as to be rotated rapidly by proper pulleys and belt-connections. Upon opposite sides of this head are fixed cutters or knives, the edges of which project from the angles of the planer-head as much as may be desired for the purpose of planing. The rear portions of these knives are slotted, and held in place by bolts passing through these slots, with nuts upon their outer ends, the adjustments being made by loosening the nuts and moving the knives in or out. This adjustment has usually been regulated by means of a rule applied to the front side of the planer-head just below the edge of the knife, and, the nuts being loosened, the knife is moved forward or backward, setting first one end and then the other until it is satisfactorily arranged.

In my invention, C is a bar having arms D extending at right angles from its ends. These arms extend far enough back to allow other arms or projections, E, to extend at right angles with them and pass down behind the planer-head, as shown. The arms D have adjusting-screws F passing through the same. These screws, upon being turned, their points resting against the rear of the planer-head, will move the bar C in or out, as may be desired. In the present case I have shown the arms D made in but one part; but I may form them in two parts without departing from the spirit of my invention. By loosening these screws the bars D may be extended or shortened at will.

The operation will then be as follows: It being desired to set a planer knife or knives so as to project at any desired distance from the planer-head, the device will be placed so that the angular arms E will extend down behind the planer-head at the opposite side from the edge of the cutter. The bars D will be adjusted by the set-screws F until the face of the bar C is brought to a line parallel with the front edge of the planer-head, and at a distance from it equal to the distance from which it is desired to set the knife-edge from the planer-head. The ordinary knife or cutter is then loosened by loosening the nuts, as before described, and its edge may be pushed forward until it comes in contact with the bar C, when the nuts are again tightened and the cutter is secured in place. The cutter upon the opposite side of the planer-head may then be adjusted by applying the device to that side, and this will insure the edges of the knives projecting so as to cut exactly alike. It will be manifest that this device might be made to adjust the bar C by means of arms and screws so arranged as to press against the front side of the planer-head; but the arrangement I have here shown is preferable, because there is less wear upon the rear side of the planer-head, and the setting can be more accurately done from this point.

Having thus described my invention, what I claim as new, and desire to secure by Letters Patent, is—

A device for setting cutters or knives in planer-heads, consisting of a bar, C, extending across the front of the planer-head, the arms D, extending rearwardly and having projections E, adapted to pass down behind the planer-head, and the adjusting-screws engaging these projections, substantially as and for the purpose described.

ADDISON POTTER.

Witnesses:
F. R. STRONG,
C. D. BOWLES.